United States Patent
Loveborn

(10) Patent No.: US 8,246,090 B2
(45) Date of Patent: Aug. 21, 2012

(54) BUMPER BEAM

(75) Inventor: Stefan Loveborn, Lund (SE)

(73) Assignee: Gestamp Hardtech AB, Lulea (SE)

( * ) Notice: Subject to any disclaimer, the term of this patent is extended or adjusted under 35 U.S.C. 154(b) by 234 days.

(21) Appl. No.: 12/311,618

(22) PCT Filed: Oct. 23, 2007

(86) PCT No.: PCT/SE2007/000931
§ 371 (c)(1),
(2), (4) Date: Nov. 2, 2009

(87) PCT Pub. No.: WO2008/069717
PCT Pub. Date: Jun. 12, 2008

(65) Prior Publication Data
US 2011/0121585 A1  May 26, 2011

(30) Foreign Application Priority Data
Oct. 10, 2006  (SE) ...................... 0602122

(51) Int. Cl.
*B60R 19/02* (2006.01)
*B60R 19/24* (2006.01)
(52) U.S. Cl. .................................................... 293/102
(58) Field of Classification Search ............ 293/102, 293/132, 133, 155
See application file for complete search history.

(56) References Cited

U.S. PATENT DOCUMENTS

| 3,831,847 | A  * | 8/1974  | Serritella ....................... 293/102 |
| 4,941,701 | A  * | 7/1990  | Loren ............................ 293/155 |
| 5,498,045 | A  * | 3/1996  | Morgan et al. ................. 293/122 |
| 6,361,092 | B1 * | 3/2002  | Eagle et al. ................... 293/102 |
| 6,540,276 | B2 * | 4/2003  | Azuchi et al. ................. 293/102 |
| 6,688,661 | B2 * | 2/2004  | Yamamoto ..................... 293/102 |
| 6,712,410 | B2 * | 3/2004  | Kudelko et al. ............... 293/102 |
| 6,863,321 | B2 * | 3/2005  | Jonsson et al. ................ 293/102 |
| 7,108,303 | B2 * | 9/2006  | Bladow et al. ................ 293/122 |
| 7,144,074 | B2 * | 12/2006 | Lee ........................... 296/203.02 |
| 7,255,378 | B1 * | 8/2007  | Baccouche et al. ........... 293/146 |
| 7,357,432 | B2 * | 4/2008  | Roll et al. ..................... 293/133 |
| 7,665,777 | B2 * | 2/2010  | Mellis et al. .................. 293/102 |
| 7,677,615 | B2 * | 3/2010  | Emura .......................... 293/102 |
| 7,678,208 | B2 * | 3/2010  | Bodin ........................... 148/648 |
| 2001/0017473 | A1 |  8/2001  | Yamaoto |
| 2003/0218341 | A1 * | 11/2003 | Jonsson et al. ............... 293/102 |
| 2006/0028032 | A1 |  2/2006  | Henseleit |
| 2009/0066095 | A1 * | 3/2009  | Karlander ..................... 293/102 |
| 2009/0273197 | A1 * | 11/2009 | Muskos ........................ 293/132 |
| 2010/0133859 | A1 * | 6/2010  | Lutke-Bexten et al. ...... 293/102 |

FOREIGN PATENT DOCUMENTS

| DE | 10135903 A1 | 2/2003 |
| EP | 1736369 A2 | 12/2006 |
| JP | 03279049 A * | 12/1991 |
| WO | WO 0238418 A1 | 5/2002 |

* cited by examiner

*Primary Examiner* — Glenn Dayoan
*Assistant Examiner* — Paul Chenevert
(74) *Attorney, Agent, or Firm* — Mark P. Stone

(57) ABSTRACT

A bumper beam has an open hat beam profile with a central flange (11), two webs (12, 13) and two side flanges (14, 15), and it has two fastening portions (16, 17) in which the central flange has transverse recesses (30, 31), which continue along the webs for a maximum of 40% of the extent of the webs in the transverse direction. These recesses strengthen the profile and provide controlled deformation in response to collision loading.

11 Claims, 4 Drawing Sheets

BUMPER BEAM

TECHNICAL FIELD

The present invention relates to a bumper beam made of sheetmetal with a central flange, two webs and side flanges, the central flange being intended to point outwards from the vehicle and the beam having two fastening portions for fastening to the vehicle.

BACKGROUND TO THE INVENTION

At the fastening portions, the beam cannot give way elastically in the same way as it can between the fastening portions. In collisions, and particularly in offset collisions, where the collision load impinges on a fastening portion, the result may be poor energy absorption, since the fastening portion often deforms in a disadvantageous manner.

OBJECT AND BRIEF DESCRIPTION OF THE INVENTION

An object of the invention is to improve the deformation properties of the beam's fastening portions. This is achieved in principle by the central flange having, at the beam's fastening portions, transverse recesses which continue along the webs for a a maximum of one-third of the extent of the webs in the transverse direction. The invention is defined by the claims.

DETAILED DESCRIPTION OF THE DEPICTED EMBODIMENT

Figure 4:
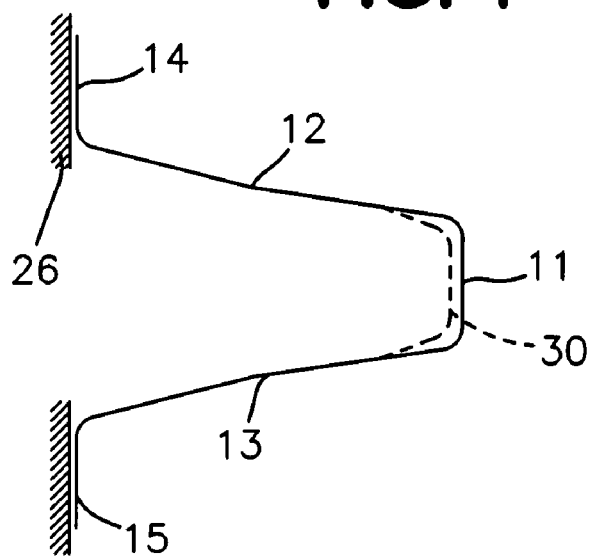
FIG. 4 is a section along the line 4-4 in FIGS. 2 and 3.
Figure 7:
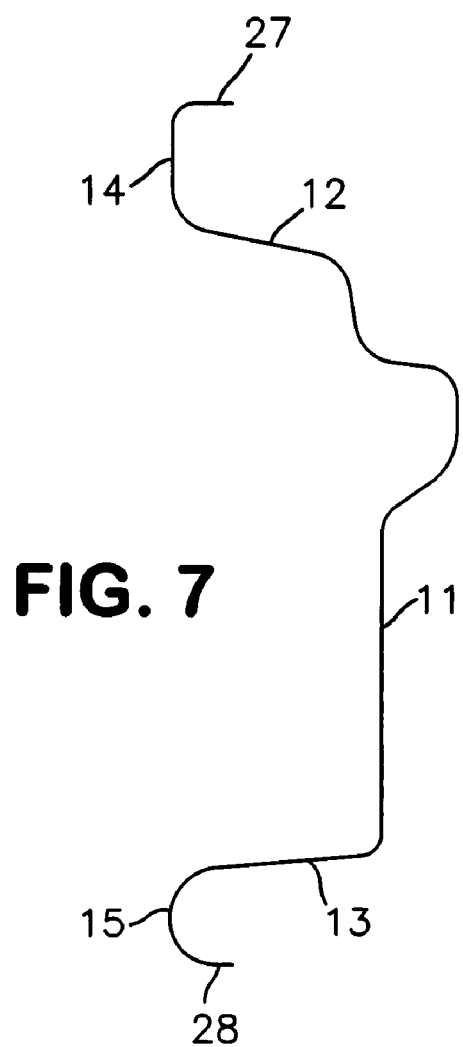
FIG. 7 is a cross-section along the line 7-7 in FIG. 2.

The bumper beam depicted is a so-called hat beam with a central flange 11, two webs 12,13 and two side flanges 14,15. The cross-section of the beam varies along its length. The beam has two fastening portions 16,17 at which the side flanges 14,15 are wide and have screw holes 18,19,20 and 21,22,23 respectively to enable them to be screwed securely to a loadbearing element of the vehicle. The central flange 11 narrows in both directions towards the fastening portions. FIG. 4 depicts the cross-section at the fastening portions. It also depicts a crash barrier 25 and the vehicle's loadbearing element 26 to which the bumper beam is fastened. FIG. 7, which is a cross-section in the middle portion of the bumper beam, shows how the central flange 11 may be stepped and the side flanges 14,15 may have bent ends 27,28. The whole profile is preferably open.

Figure 1:
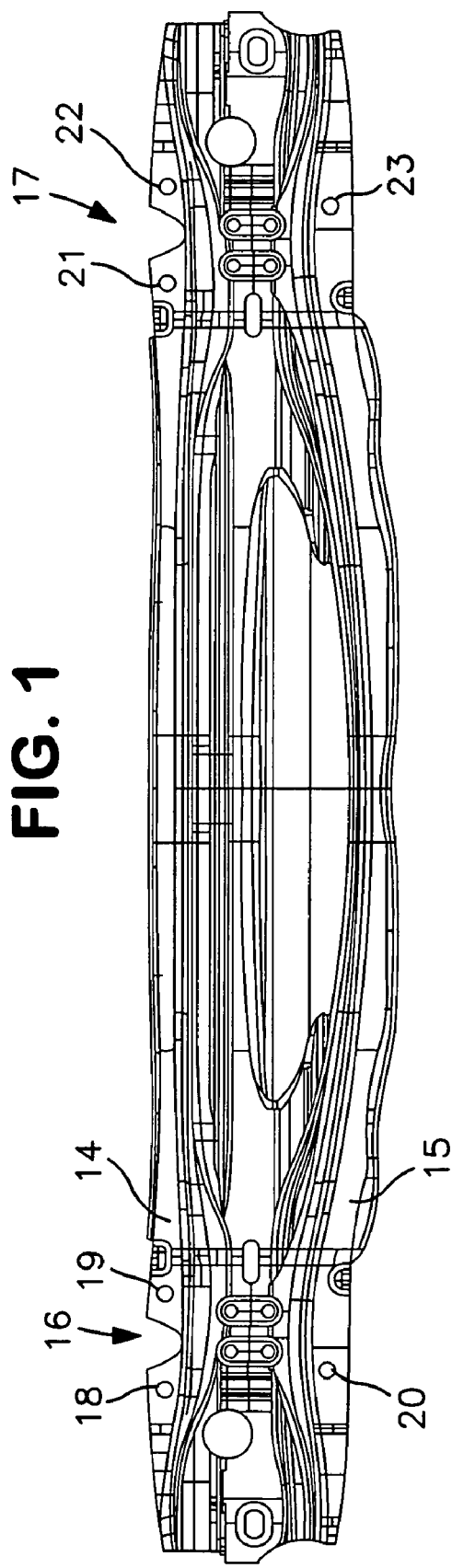
FIG. 1 is a front view of a bumper beam according to the invention, depicted as an example of the invention.
Figure 2:
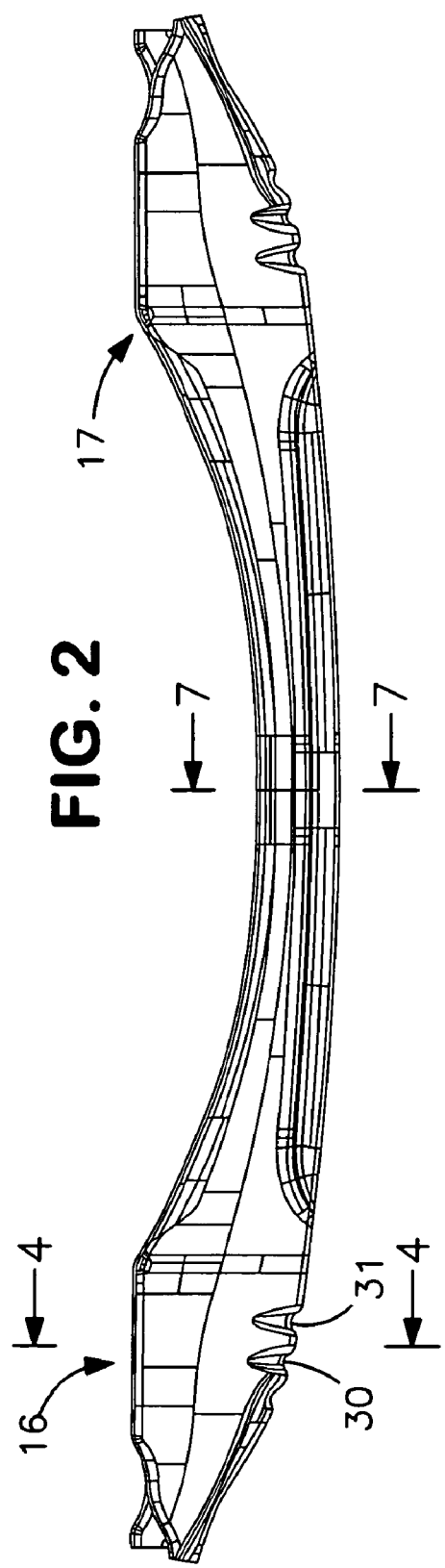
FIG. 2 is a view as seen from above of the same bumper beam.
Figure 3:
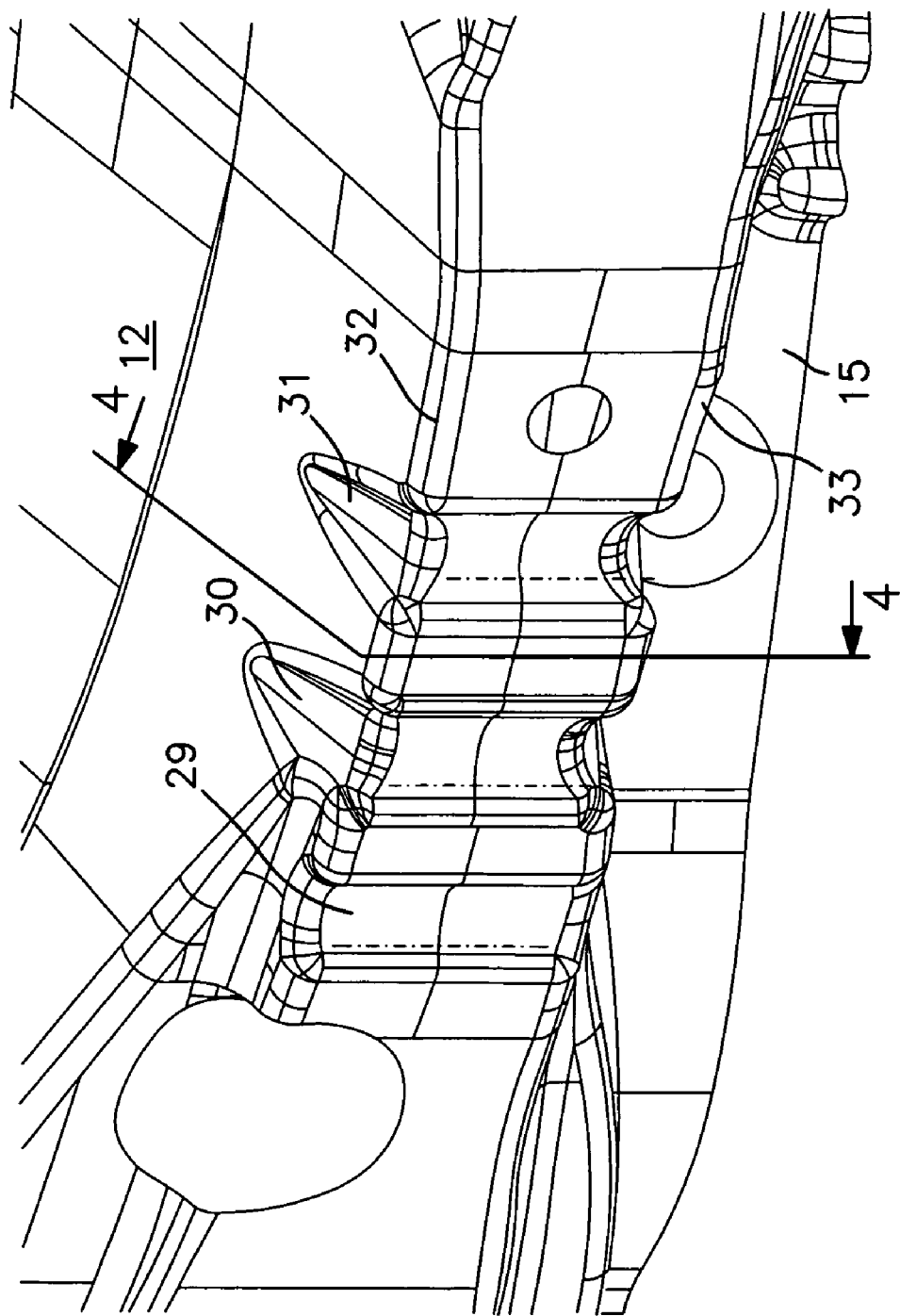
FIG. 3 is a detail view in perspective of part of the bumper beam.

FIG. 3 depicts in perspective the left fastening portion 16 in FIGS. 1 and 2. The two fastening portions are in principle alike and only the fastening portion 16 is described in detail. The profile of the bumper beam is tall and narrow at the fastening portions, i.e. the extent of the webs in the transverse direction, the web height, is large and decreases towards both ends in the longitudinal direction of the beam. The web height is greater than the width of the central flange.

The central flange 11 has two transverse recesses 30,31 which extend beyond the angles 32,33 between the central flange and the webs and continue for a short distance along the webs. The width and depth of the recesses decrease continuously to where they end on the webs. The recesses extend along not more than 40% and preferably not more than one-third of the extent of the webs. There is also a recess 29 which does not extend beyond the angles. FIG. 4 depicts a barrier 25 centrally to the bumper profile at the fastening portion and is intended to illustrate a collision.

As illustrated by FIG. 3, a substantially planar portion of the central flange is disposed between the two transverse recesses 30, 31. The transverse recesses 30, 31 extend from the top to the bottom of the central flange.

Figure 5:
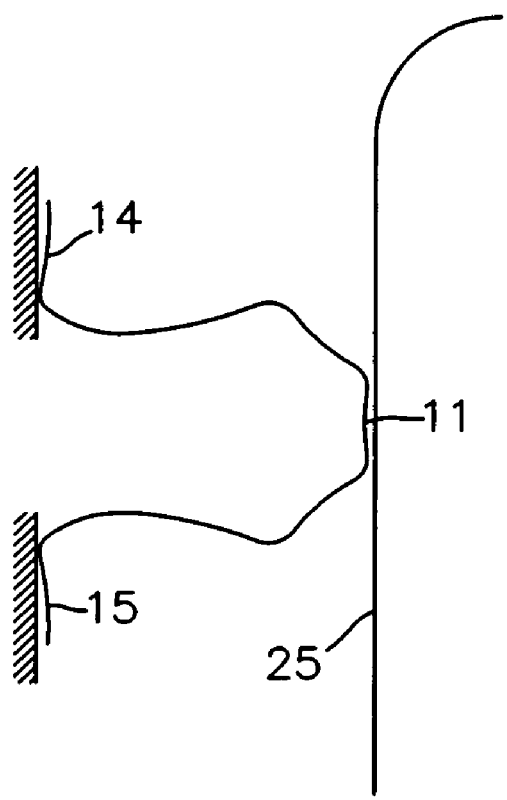
FIGS. 5 and 6 correspond to FIG. 4 and show the deformation during a collision process.
Figure 6:
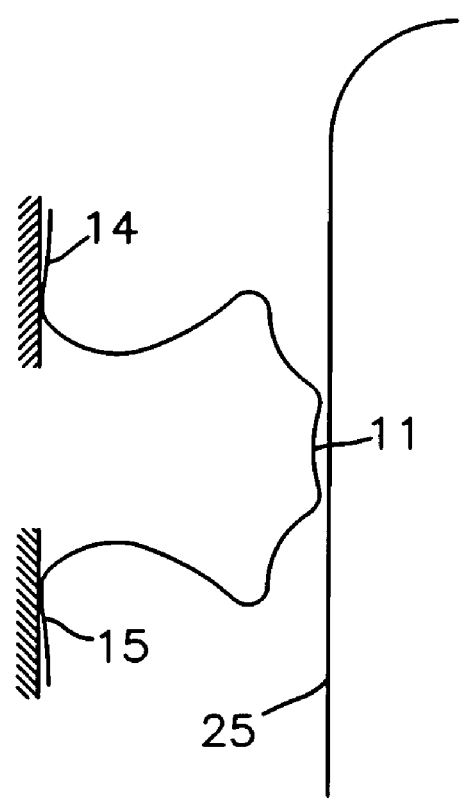

The recesses 30,31 strengthen the central flange, in an offset collision they counteract inward deflection of the central flange and, since the recesses also strengthen the angles and the webs, the ends of the recesses will serve as deformation initiators (triggers). FIG. 5 illustrates the first part of a deformation process and FIG. 6 the continuing process. The recesses 30,31 strengthen the profile and delay the commencement of deformation and thereafter cause controlled initiation of deformation and controlled continuing deformation, resulting in better energy absorption. The central flange is slightly curved, but if the profile is open it can give way elastically except at the fastening portions, and it is therefore important that the profile should, where it can, withstand great force before it begins to deform and that it should thereafter deform in a controlled manner. The effect of the recesses therefore becomes important both in directly frontal collisions and in offset collisions.

The bumper beam may with advantage be made from a flat blank of hardenable steel by the press-hardening process in which the blank is first heated to austenitising temperature and is thereafter hot-formed in a cooled tool in which it can remain after the forming process, using the tool as a fixture until the steel has hardened. By this method it is possible to achieve very high strength values, e.g. a yield point exceeding 1200 MPa, and good tolerances. The invention is nevertheless not limited to this process, nor to steel.

The invention claimed is:

1. A bumper beam made of sheetmetal with a central flange (11) having a vertical cross-section, two webs (12, 13) and side flanges (14, 15), the central flange being intended to point outwards from the vehicle and the beam having two fastening portions (16, 17) for fastening to the vehicle (26), characterised in that the central flange (11) has, at the beam's fastening portions (16, 17), a plurality of transverse recesses (30, 31) which extend substantially from the top to the bottom of the central flange and which continue along the webs (12, 13) for a maximum of 40% of the extent of the webs in the transverse direction of the vertical cross-section.

2. A bumper beam according to claim 1, characterised in that the central flange (11) is narrowest at the fastening portions (16, 17), and the side flanges (14, 15) are arranged to being fastened to the vehicle (26).

3. A bumper beam according to claim 1, wherein a substantially planar portion of said central flange is disposed between two of said plurality of transverse recesses at the fastening portions of the beam.

4. A bumper beam according to claim 1, characterised in that the width of the recesses (30, 31) decreases along their extent along the webs in the transverse direction of the vertical cross-section.

5. A bumper beam according to claim 4, characterised in that the central flange (11) is narrowest at the fastening portions (16, 17), and the side flanges (14, 15) are arranged to being fastened to the vehicle (26).

6. A bumper beam according to claim 1, characterised in that the recesses extend across a maximum of one-third of the extent of the webs in the transverse direction of the vertical cross-section.

7. A bumper beam according to claim 6, characterised in that the width of the recesses (30, 31) decreases along their extent along the webs in the transverse direction of the vertical cross-section.

8. A bumper beam according to claim 6, characterised in that the central flange (11) is narrowest at the fastening portions (16, 17), and the side flanges (14, 15) are arranged to being fastened to the vehicle (26).

9. A bumper beam according to claim 1, characterised in that the depth of the recesses (30, 31) decreases along their extent along the webs in the transverse direction of the vertical cross-section.

10. A bumper beam according to claim 9, characterised in that the width of the recesses (30, 31) decreases along their extent along the webs in the transverse direction of the vertical cross-section.

11. A bumper beam according to claim 9, characterised in that the central flange (11) is narrowest at the fastening portions (16, 17), and the side flanges (14, 15) are arranged to being fastened to the vehicle (26).

\* \* \* \* \*